(12) United States Patent
Gussmann et al.

(10) Patent No.: US 11,324,355 B2
(45) Date of Patent: May 10, 2022

(54) COFFEE MACHINE FOR PREPARATION OF PRESSURE-EXTRACTED COFFEE WITH A LOW PARTICLE CONTENT

(71) Applicant: WMF Group GmbH, Geislingen/Steige (DE)

(72) Inventors: Jochen Gussmann, Schwabisch-Gmünd (DE); Christian Schürle, Neu-Ulm (DE); Yoshihiro Kaneko, Saitama (JP)

(73) Assignee: WMF GMBH, Geislingen an der Steige (DE)

( * ) Notice: Subject to any disclaimer, the term of this patent is extended or adjusted under 35 U.S.C. 154(b) by 178 days.

(21) Appl. No.: 16/316,072

(22) PCT Filed: Jul. 4, 2017

(86) PCT No.: PCT/EP2017/066649
§ 371 (c)(1),
(2) Date: Jan. 8, 2019

(87) PCT Pub. No.: WO2018/011020
PCT Pub. Date: Jan. 18, 2018

(65) Prior Publication Data
US 2019/0343321 A1    Nov. 14, 2019

(30) Foreign Application Priority Data
Jul. 15, 2016   (DE) .................... 10 2016 212 988.0

(51) Int. Cl.
*A47J 31/06*    (2006.01)
*A23F 5/26*    (2006.01)
(Continued)

(52) U.S. Cl.
CPC ............... *A47J 31/06* (2013.01); *A23F 5/262* (2013.01); *A47J 31/24* (2013.01); *A47J 31/36* (2013.01); *A47J 31/043* (2013.01); *A47J 31/40* (2013.01)

(58) Field of Classification Search
CPC .. A47J 31/06; A47J 31/36; A47J 31/24; A47J 31/40; A47J 31/043; A47J 31/525; A47J 31/404; A47J 31/42; A47J 31/5251
(Continued)

(56) References Cited

U.S. PATENT DOCUMENTS

| 2,626,558 A | 1/1953 | Stein |
| 2,997,178 A | 8/1961 | Lorimer |

(Continued)

FOREIGN PATENT DOCUMENTS

| CN | 2732112 Y | 10/2005 |
| CN | 2768621 Y | 4/2006 |

(Continued)

OTHER PUBLICATIONS

English translation of International Search Report, issued in International Application No. PCT/EP2017/066649, dated Oct. 4, 2017, pp. 1-2, European Patent Office, Rijswijk, Netherlands.
(Continued)

*Primary Examiner* — Phuong T Nguyen
(74) *Attorney, Agent, or Firm* — Crowell & Moring LLP

(57) ABSTRACT

A coffee machine for the preparation of pressure-extracted coffee with a low particle content is provided. The coffee machine differs from known machines for pressure-extraction of coffee by comprising a filter element for reducing the particle content of coffee, which filter element is disposed downstream of the percolating sieve and is connected fluidically to the percolating sieve and to the outflow. By means of the filter element, coffee extracted by pressure in the
(Continued)

percolating unit can be filtered before dispensing the outflow so that suspended particles and emulsified oils of a specific size are separated from the coffee by the filter element and a new coffee is produced. In addition, the coffee machine can prepare standard pressure-extracted coffee since the coffee from the percolating unit can also be guided past the filter element, i.e. need not flow necessarily via the filter element to the outflow.

20 Claims, 5 Drawing Sheets

(51) Int. Cl.
*A47J 31/36* (2006.01)
*A47J 31/24* (2006.01)
*A47J 31/40* (2006.01)
*A47J 31/043* (2006.01)

(58) Field of Classification Search
USPC ......... 99/279, 280, 281, 290, 292, 293, 294, 99/295, 296, 297, 298, 316, 317, 318, 99/319, 321, 323; 426/271, 397, 423, 426/433, 546, 594
See application file for complete search history.

(56) References Cited

U.S. PATENT DOCUMENTS

| | | | |
|---|---|---|---|
| 3,773,180 A | 11/1973 | Harrison | |
| 4,642,183 A | 2/1987 | Hebert | |
| 7,717,026 B1* | 5/2010 | Lassota | A47J 31/56 99/283 |
| 2003/0145736 A1 | 8/2003 | Green | |
| 2007/0039476 A1 | 2/2007 | Kodden | |
| 2008/0038441 A1* | 2/2008 | Kirschner | A47J 31/085 426/594 |
| 2014/0161937 A1 | 6/2014 | Rondelli | |
| 2015/0014250 A1* | 1/2015 | Volker | B01D 61/12 210/652 |
| 2016/0022089 A1 | 1/2016 | Moretto | |
| 2019/0343321 A1 | 11/2019 | Gussmann et al. | |

FOREIGN PATENT DOCUMENTS

| | | |
|---|---|---|
| CN | 101778587 A | 7/2010 |
| CN | 101862120 A | 10/2010 |
| CN | 202918964 U | 5/2013 |
| CN | 103582601 A | 2/2014 |
| CN | 103917634 A | 7/2014 |
| CN | 105725808 A | 7/2016 |
| DE | 6939904 U | 3/1970 |
| DE | 6607066 U | 1/1971 |
| DE | 3200440 A1 | 7/1983 |
| DE | 100 22 538 A1 | 11/2001 |
| DE | 10 2010 004 729 A1 | 7/2011 |
| DE | 10 2010 012 788 A1 | 9/2011 |
| DE | 202012007498 U1 | 10/2012 |
| EP | 1593328 A2 | 11/2005 |
| EP | 3157839 B1 | 10/2018 |
| GB | 2505041 A | 2/2014 |
| JP | 2010-535076 | 11/2010 |
| WO | WO 2005/107540 A1 | 11/2005 |
| WO | WO 2009/017927 A1 | 2/2009 |
| WO | WO 2011/097866 A1 | 8/2011 |

OTHER PUBLICATIONS

Notice of Reasons for Refusal with English translation, issued in JP Application No. 2019-201943, dated Jul. 21, 2020, pp. 1-8, Japanese Patent Office, Tokyo, Japan.
Korean Office Action with English translation, issued in KR Patent Application No. 10-2019-7003704, dated Feb. 24, 2021, pp. 1-7, Korean Patent Office, Seoul, Korea.
Chinese Office Action with English translation for Chinese patent Application No. 201780055490.7, dated Mar. 12, 2021, pp. 1-13.
We, He, "Bee breading and utilization", Central Plains Farmers Press, Zhengzhou, China Apr. 2013, first edition, pp. 1-4.
Wei, Guo, Driver of special equipment running from wheel to wheel security Technology questions and answers, China Railway Press, Beijing, China 2004, pp. 1-5.
Xu, Zhiyi, "Mechatronics Practical Technology", Shanghai Science and Technology Literature Press, Shanghai, China, Apr. 1995, first edition, pp. 1-3.
Yu, Yongqing et al., "Economical drip irrigation technology 100 ask", Zhejiang Science and Technology Publishing House, Hangzhou, China, Sep. 2011, first edition, pp. 1-8.
Chinese Office Action Rejection Decision with English Translation for Chinese Patent application No. 2017800554907 dated Sep. 2, 2021, pp. 1-18, China National Intellectual Property Administration, Beijing, People's Republic of China.
Korean Office Action and English Translation for Korean Patent Application No. 10-2019-7003704, dated Aug. 31, 2021, pp. 1-6, Korean Patent Office, Seoul, Korea.
Korean Office Action and English Translation for Korean Patent application No. KR 10-2019-7023874, dated Sep. 30, 2021, pp. 1-7, Korean Patent Office, Seoul, Korea.
Taiwanese Office Action with English translation, issued in Taiwan Patent Application No. 10820238720, dated Mar. 19, 2019, pp. 1-14, Taiwan Intellectual Property Office, Taipei, Taiwan.
Final Office Action regarding U.S. Appl. No. 16/486,890 dated Mar. 16, 2022.

* cited by examiner

A)

B)

COFFEE MACHINE FOR PREPARATION OF PRESSURE-EXTRACTED COFFEE WITH A LOW PARTICLE CONTENT

CROSS-REFERENCE TO RELATED APPLICATIONS

This application is a 371 nationalization of international patent application PCT/EP2017/066649 filed Jul. 4, 2017, which claims priority under 35 USC § 119 to German patent application DE 10 2016 212 988.0 filed Jul. 15, 2016. The entire contents of each of the above-identified applications are hereby incorporated by reference.

DETAILED DESCRIPTION

Figure 1:
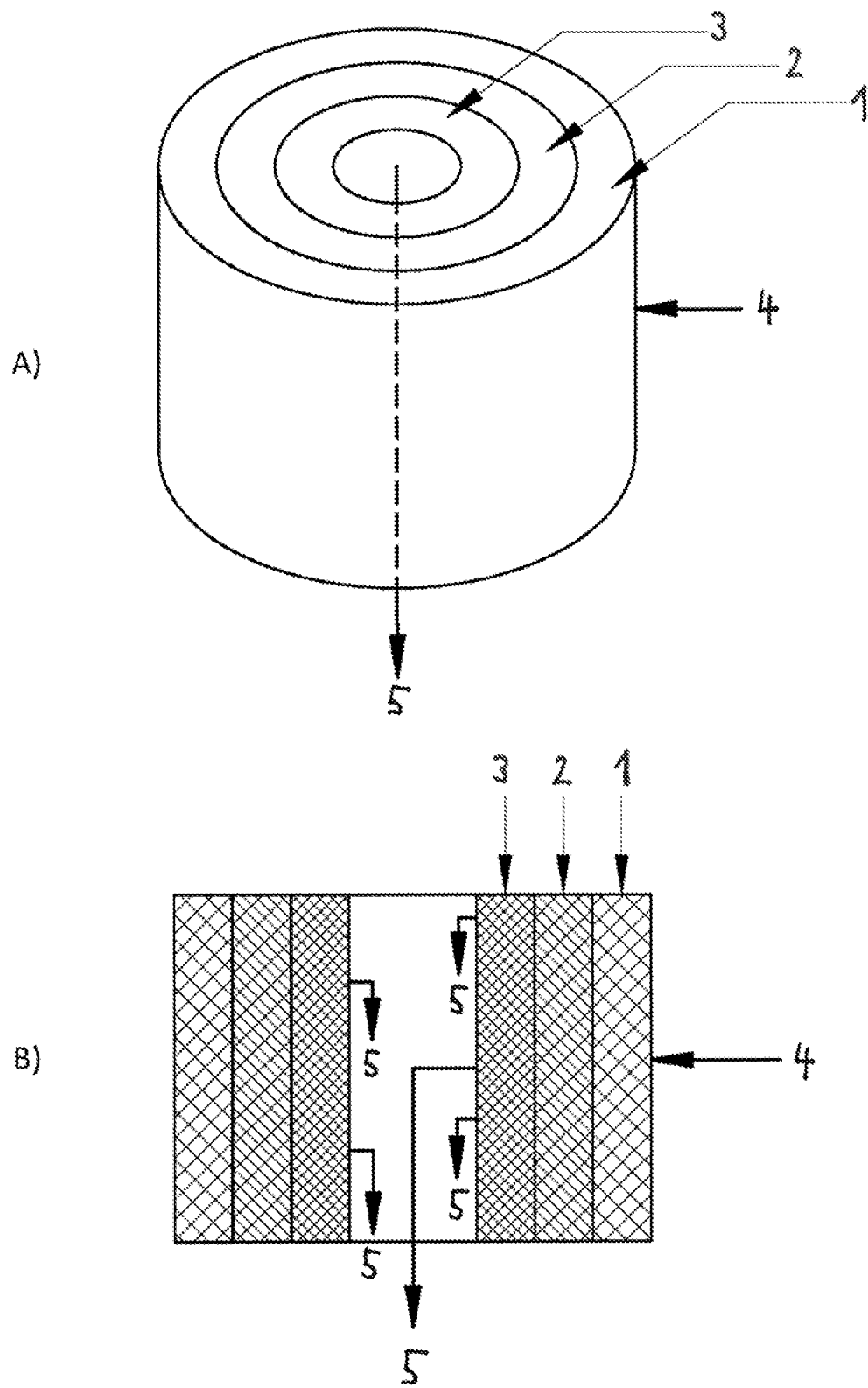
FIG. 1A is a perspective view of the innards of a filter element.
FIG. 1B is a cross-sectional view of the innards of a filter element.

A coffee machine for the preparation of pressure-extracted coffee with a low particle content is provided. The coffee machine differs from machines for pressure-extraction of coffee, which are known in the state of the art, by comprising a filter element for reducing the particle content of coffee, which filter element is disposed downstream of the percolating sieve and is connected fluidically to the percolating sieve and to the outflow. By means of the filter element, coffee extracted by pressure in the percolating unit can be filtered before dispensing at the outflow so that suspended particles and emulsified oils of a specific size are separated from the coffee by the filter element and a new coffee is produced. In addition, the coffee machine can prepare standard pressure-extracted coffee since the coffee from the percolating unit can also be guided past the filter element, i.e. need not flow necessarily via the filter element to the outflow.

Coffee machines for the preparation of pressure-extracted coffee specialities (e.g. espresso or cappuccino) generally use percolating systems in which the coffee drink is percolated under pressure (approx. 4-16 bar). For this purpose, percolating sieves which are automatically cleanable are used and avert clogging of the percolating sieves by deposits of components of the coffee bean (e.g. insoluble components of the ground coffee beans and coffee oils) during operation. Clogging of the percolating sieves is generally produced as a result of relatively large sieve openings (i.e. wide-mesh sieve holes). For specific coffee specialities, such as espresso and cappuccino, particles which hereby pass through the relatively coarse sieve holes are even desired. These are responsible for the particular flavour of these coffee specialities.

In addition, during pressure-percolation of these coffee specialities, a so-called "crema" is produced by a pressure reduction at the percolating sieve, which crema is composed mainly of emulsified coffee oils but also comprises particles and partially expanded $CO_2$. The "crema" is likewise desired with these coffee specialities since it contributes to the visual aspect and to the flavour, respectively.

Standard filter coffee has, in contrast, virtually no particles and also no "crema". The reason for this is that standard filter coffee is percolated generally without applied pressure, i.e. the percolating pressure generally corresponds simply to the hydrostatic pressure of the water column above the filter base. At least during production of standard filter coffee, no extraction pressures like during espresso production (approx. 4-16 bar) are produced. The consequence hereof is that the production of standard filter coffee is associated with long percolating times. Since in addition in the production thereof, significantly finer (i.e. narrower-mesh) sieves are used (pore diameter in the range of 1 to 50 µm), the sieve bases of these sieves often have a fairly large surface area. This prevents the extraction time from being unnecessarily prolonged. Often the sieves used here are produced from paper and/or metal.

There is a requirement in the state of the art for a device which makes it possible to prepare pressure-extracted coffee with a low content of dispersed particles. It would be even more desirable if both pressure-extracted coffee specialities (e.g. espresso) and standard filter coffee could be prepared in one device.

WO 2005/107540 discloses a coffee machine which has two separate percolating units. One of the two percolating units is responsible for the preparation of common pressure-extracted coffee, the other percolating unit serves for the preparation of standard filter coffee.

US 2003/0145736 A1 discloses a coffee machine which has two water-guiding circuits. One of the two circuits serves for percolation of the coffee at high pressure and the other of the two circuits for supplying hot water or cold water at low pressure.

It is disadvantageous with the solutions from the state of the art that either two separate percolating systems and dispensing points are required for the preparation of the different types of coffee drinks, which implies greater production complexity, high production costs and greater maintenance complexity, or that the provision of standard filter is associated with high expenditure in effort and time.

Starting herefrom, it was the object of the present invention to provide a device which solves the problems of the state of the art.

According to the invention, a coffee machine for the preparation of pressure-extracted coffee with a low particle content is provided, comprising a) a percolating unit for the extraction of coffee with a liquid under pressure, the percolating unit comprising a percolating sieve;

b) an outflow for dispensing coffee, the outflow being disposed downstream of the percolating unit;

characterised in that the coffee machine comprises a filter element for reducing the particle content of coffee, which filter element is disposed downstream of the percolating sieve and is connected fluidically to the percolating sieve and to the outflow.

As a result of the arrangement of the filter element downstream of the percolating sieve, a filtration process which is subsequent to the percolating process under pressure takes place. The latter withdraws from the coffee extracted under pressure the finest components, i.e. suspended particles (sediments) and emulsified coffee oils situated in the pressure-extracted coffee. By filtering off the coffee oils or by the filtration process per se, any possibly produced "crema" is filtered off or destroyed. By filtering the pressure-extracted coffee through the filter element, the coffee drink hence obtains a different flavour and, because of the lack of the ultrafine, dispersed components and also the "crema", a significantly different visual aspect. Consequently, a crucial advantage of the coffee machine according to the invention is that different coffee products can be prepared in a simple and rapid manner without a second percolating unit.

In a preferred embodiment, the filter element has a specific maximum pore size which is smaller than the maximum pore size of the percolating sieve. The percolating sieve can have a maximum pore size of greater than 80 µm, preferably greater than 100 µm.

Preferably, the percolating unit of the coffee machine is suitable for extracting coffee with a liquid at a pressure of 4 to 16 bar.

The coffee machine can be characterised in that the filter element is disposed, preferably reversibly,
  i) in the percolating unit, preferably near the percolating sieve in the percolating unit, optionally in contact with the percolating sieve; or
  ii) between the percolating unit and the outflow; or
  iii) at the outflow; or
  iv) in the outflow;
the filter element being disposed optionally within a housing of the coffee machine, preferably behind an operating diaphragm, to be opened, of the coffee machine. In a preferred embodiment, the filter element is not in contact with the percolating sieve, optionally not in contact with the percolating sieve and not in contact with the percolating unit. In this case, the filter element is a separate component of the coffee machine which is separate from the percolating unit and/or the percolating sieve. This has the effect that the filter element can be removed more easily from the coffee machine and can be inserted more easily into the coffee machine. As a result, a simpler exchangeability of the filter element is achieved and simplified handling of the coffee machine is effected.

The filter element can
  i) comprise a fluid pipe which is connected downstream to the percolating unit; and/or
  ii) comprise a fluid pipe which is connected downstream to the outflow, optionally via a fluid pipe between the percolating unit and the outflow; and/or
  iii) comprise the outflow or comprise at least one further outflow.

The filter element can
  i) comprise at least one filter which has a maximum pore size of 80 µm and preferably has a thickness of 0.1 mm to 10 mm; and/or
  ii) comprise at least one fine filter which preferably has a maximum pore size of 25 µm and, particularly preferably, has a thickness of 0.1 mm to 10 mm; and/or
  iii) comprise at least one ultrafine filter which preferably has a maximum pore size of 10 µm and, particularly preferably, has a thickness of 0.1 mm to 10 mm;
or can consist thereof, the filter element preferably comprising at least one filter, at least one fine filter and at least one ultrafine filter or consisting thereof and, particularly preferably, the at least one fine filter being disposed downstream of the filter and the at least one ultrafine filter downstream of the fine filter. It is preferred that the maximum pore size (mesh size) of the fine filter is smaller than the filter and the maximum pore size of the ultrafine filter is smaller than the fine filter. Equipping the filter element with a fine filter and/or ultrafine filter has the advantage that smaller particles can be separated from the coffee in stages. In addition, a significantly higher capacity of the filter element can be achieved with the resulting multilayer arrangement of the filter element than if only one filter, fine filter or ultrafine filter is used. The available sieve surface area is therefore exploited optimally.

The maximum pore size of an element (e.g. of the filter element or of the filter, of the fine filter and ultrafine filter and also of the percolating sieve) can be determined in a simple manner by a dispersion of particles of a known size distribution being made to flow through the element and subsequently the size distribution of the particles on the side of the entrance of the dispersion and/or on the side of the exit of the dispersion being determined via a microscopic method.

The filter element, preferably at least one filter, fine filter and/or ultrafine filter of the filter element, can comprise
  i) paper; and/or
  ii) plastic material; and/or
  iii) metal;
or consist thereof.

Plastic material or metal filters have the advantage that they are mechanically more durable and hence enable longer maintenance intervals relative to paper filters. Paper filters have the advantage however that they are available more cheaply and hence the coffee machine can be supplied more cheaply.

The filter element, preferably at least one filter, fine filter and/or ultrafine filter of the filter element, can essentially be configured in the form of a linear or diagonal cylinder which preferably has a base which is selected from the group consisting of circular base, semi-circular base, crescent-shaped base, elliptical base and base with at least two corners.

The filter element, preferably at least one filter, fine filter and/or ultrafine filter of the filter element, can be subjected, with fluid, preferably an aqueous solution, particularly preferably coffee,
  i) to a flow radially, preferably be subjected to a flow with fluid coming upstream radially in the direction towards an axis of the cylinder and/or be subjected to a flow with fluid coming downstream radially in the direction away from an axis of the cylinder; and/or
  ii) to a flow axially, preferably be subjected to a flow with fluid coming upstream in the direction along an axis of the cylinder from an upper-side of the filter element to an underside of the filter element and/or be subjected to a flow with fluid coming downstream in the direction along an axis of the cylinder from an underside of the filter element to an upper-side of the filter element.

The radial flow has the advantage that the filter element has a smaller maximum spatial extension, with a specific sieve surface area, than with the axial flow. It is hereby advantageous if the narrowness of the meshes of the inserted sieves increases in flow direction, i.e. the fluid flows for example firstly through a filter (outer casing of the cylinder), then through a fine filter (central casing of the cylinder) and subsequently through an ultrafine filter (inner casing of the cylinder). The radial flow here has the advantage that it is more economical and more ecological than the axial flow, with comparable filtration quality, since the surface area of the ultrafine filter is smaller than the surface area of the fine filter and the surface area of the fine filter is smaller than the surface area of the filter.

The percolating unit can comprise a fluid pipe which is connected downstream to the outflow and represents a fluidic connection from the percolating unit to the outflow, circumventing the filter element.

The coffee machine can comprise a bypass valve upstream of the filter element, which valve is suitable for switching between a fluidic connection of the percolating unit via the filter element to the outflow, on the one hand, and a fluidic connection from the percolating unit, circumventing the filter element, towards the outflow, on the other hand, the bypass valve being connected, particularly preferably, to a control unit which is suitable for switching the valve as a function of an input by a user of the coffee machine.

The coffee machine can comprise at least one fluid pipe, preferably a liquid pipe and/or gas pipe, particularly preferably a gas pipe, which
  i) is connected to the filter element; and/or
  ii) is connected to a fluid pipe which is disposed upstream of the filter element; and/or
  iii) is connected to a fluid pipe which is disposed downstream of the filter element;
the at least one fluid pipe comprising preferably a valve, particularly preferably a flush valve, and being connected, particularly preferably, to the outflow. This at least one fluid pipe (in particular gas pipe) has the advantage that, after dispensing a first coffee, residual quantities of coffee, still located in the fluid pipes or in the filter element of the coffee machine, can be conveyed to the outflow and into a collection shell of the coffee machine. One advantage is higher quality with respect to freshness and temperature of a second coffee which follows temporally offset to the first coffee.

Furthermore, the coffee machine can comprise at least one mounting for the filter element, the mounting being configured preferably such that it fixes the filter element via a reversible connection, preferably via a screw closure, flap closure and/or bayonet closure, to the coffee machine.

The coffee machine can
  i) comprise at least one sensor which is suitable for detecting the functional capacity of the filter element, the at least one sensor preferably contacting the filter element or being disposed in a fluid pipe upstream of the filter element and being selected, particularly preferably, from the group consisting of pressure sensor, flow sensor and mixtures hereof; and/or
  ii) comprise at least one valve, preferably a pressure relief valve which is preferably suitable for establishing a fluidic connection from the percolating unit, circumventing the filter element, to the outflow at a pressure above a specific maximum pressure, the valve being disposed, particularly preferably, in a fluid pipe which is connected in parallel to the filter element.

The at least one sensor can send a signal to the control unit as to whether a filter element is inserted or whether the mounting of the filter element is situated in a closed state (e.g. liquid-impermeable state). The at least one valve represents a safety mechanism in case the filter element should become blocked. In the case of blockage of the filter element, the coffee machine, without this valve, would no longer be able to dispense coffee via the "filter coffee" pipe. As a result of the presence of this valve, at least also standard pressure-percolated coffee (e.g. espresso) can be dispensed by the coffee machine via this pipe.

The coffee machine can comprise at least one unit for heating the filter element, preferably at least one electrical heating unit, particularly preferably at least one heating wire and/or at least one heating pipe which can have fluid applied, in particular a heating pipe for water and/or gas. The filter element has a specific heat capacity which takes the temperature from the percolating drink. The advantage of a unit for heating the filter element is that as little heat energy as possible is withdrawn from the coffee prepared under pressure by the percolating unit by passing through the filter element. The quality of the drink dispensed by the coffee machine with respect to the temperature thereof can consequently be enhanced.

Furthermore, the coffee machine can comprise at least one fluid pipe between the filter element and the outflow, which fluid pipe is connectable or is connected to a fluid source, preferably to a hot water source and/or cold water source.

Furthermore, a method for the preparation of pressure-extracted coffee with a low particle content is provided according to the invention, comprising the steps:
  a) extraction of coffee with a liquid under pressure, a percolating sieve being used for the extraction; and
  b) conducting the extracted coffee through a filter element for reducing the particle content of coffee.

In a preferred embodiment, a filter element is used, which element has a specific maximum pore size which is smaller than the maximum pore size of the percolating sieve which is used.

The extraction of coffee with a liquid under pressure can hereby take place in a percolating unit of a coffee machine, the liquid preferably concerning water.

The pressure reducing at the percolating sieve, which is produced by the extraction of coffee, can be in the range of 4 to 16 bar, preferably 6 to 14 bar, particularly preferably, 8 to 12 bar.

A pressure reducing at the filter element, which is produced by conducting the extracted coffee through the filter element, can be at most 3 bar, preferably at most 2 bar, particularly preferably at most 1 bar, in particular at most 0.5 bar.

The filter element can be connected fluidically to a percolating unit and to an outflow and can be disposed downstream of the percolating unit and upstream of the outflow.

After conducting the extracted coffee through a filter element, the filtered coffee can be conducted towards an outflow for dispensing coffee, the outflow being connected fluidically to a percolating unit via at least one fluid pipe and being disposed downstream of the percolating unit.

In a preferred embodiment of the method, the method is implemented with a device according to the invention. All features which relate to the device according to the invention can hence also be features of the method according to the invention.

Finally, the use of the coffee machine according to the invention for the preparation of pressure-extracted coffee with a low particle content is proposed.

The subject according to the invention is intended to be explained in more detail with reference to the subsequent Figures without wishing to restrict said subject to the specific embodiments represented here.

REFERENCE NUMBER LIST

1: filter (pore size ≤80 μm);
2: fine filter (pore size ≤25 μm);
3: ultrafine filter (pore size ≤10 μm);
4: fluid flow direction from percolating unit situated upstream;
5: fluid flow direction to outlet situated downstream;
6: fluid flow direction through filter (and fine filter and ultrafine filter);

7: pressure sensor (position switch) on non-elastic wall of the filter element;
8: sealing element in filter element;
9: wall of the filter element;
10: voltage source;
11: pressure relief valve connected fluidically in parallel to the filter element;
12: electrical heating element (e.g. PTC element);
13: filter element;
14: percolating unit for extraction of coffee;
15: outflow for dispensing coffee;
16: throughflow quantity meter;
17: water inflow;
18, 18': pressure sensor or pressure switch;
19, 19': diaphragm;
20, 20': compressed air supply (via air pump);
21: bypass valve;
22: fluid flow during backflushing;
23: direction collection shell of the coffee machine;
24, 24': valve;
25: fluid pipe of the filter element which is connected fluidically upstream to the percolating unit;
26: fluid pipe of the filter element which is connected fluidically downstream to the outflow;
27: fluid pipe between percolating unit and outflow which is connected fluidically upstream to the filter element;
28: outflow for dispensing coffee as part of the filter element;
29: fluid pipe between percolating unit and outflow which represents a fluidic connection from the percolating unit to the outflow, circumventing the filter element;
30: flush valve;
31: cup for receiving coffee;
32: distribution sieve;
33: percolating chamber of the percolating unit for receiving ground coffee;
34: percolating unit;
35: sealing element in percolating unit;
36: percolating sieve in percolating unit;
37: bypass for coffee, i.e. flow of coffee past filter element.

FIG. 1 shows a schematic view from diagonally above (FIG. 1A) and from the side (FIG. 1B) on the innards of a filter element inserted in the device according to the invention and in the method according to the invention. The illustrated variant has a filter 1, a fine filter 2 and an ultrafine filter 3 which are all configured in the form of a cylinder. Fluid coming upstream from the percolating unit flows in direction 4 and in direction of the filter 1, the filter 1 forming an outer cylinder. Subsequently, the fluid flows radially in the direction of the axis of the cylinder through the filter 1, the fine filter 2 and the ultrafine filter 3 in order then to flow downstream in direction 5 out of the outlet of the filter element.

Figure 2:
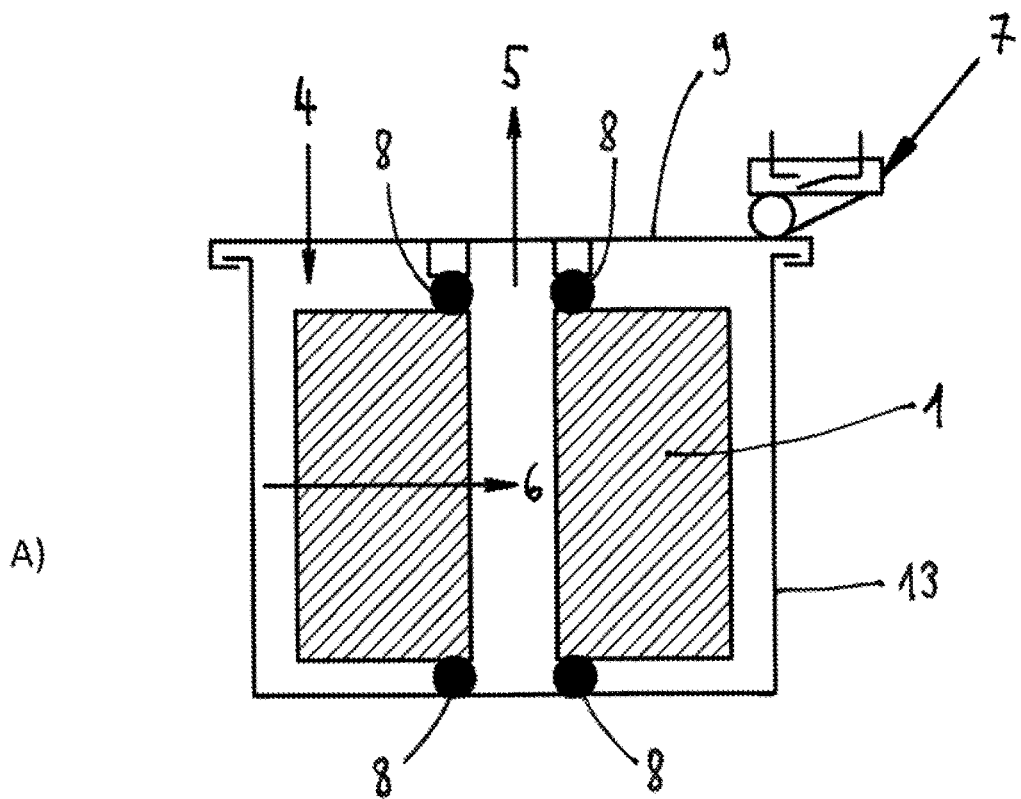
FIG. 2A is a schematic side view of a filter element showing the fluid flow direction into the filter element and the fluid flow direction out of the filter element.
FIG. 2B is a schematic side view of a filter element additionally showing a pressure relief valve and an electrical heating element.
Figure 2:
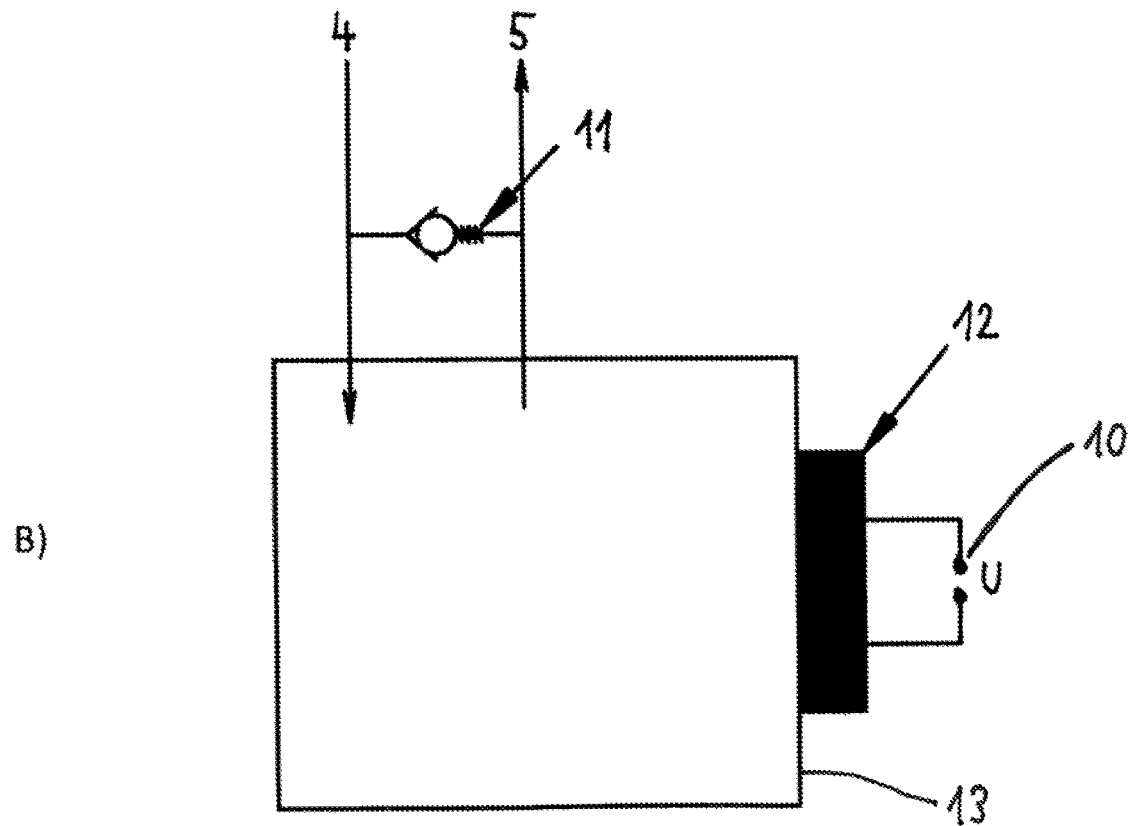

FIG. 2 shows a schematic side view of a filter element 13 according to the invention. In FIG. 2A, the fluid flow direction 4 into the filter element and the fluid flow direction 5 out of the filter element is illustrated. The fluid situated in the filter element 13 passes through the filter 1 and possible further filters situated in the filter element (fine filter and/or ultrafine filter) in direction 6 radially to the axis of the cylinder which is formed by the filter or filters. Sealing elements 8 ensure that no fluid (e.g. coffee) flows past the filter 1 and the entire fluid must pass through the filter 1. A wall 9 of the filter element 13 contacts a position switch 7 of the coffee machine and signals to the coffee machine that the filter element 13 is correctly inserted. In FIG. 2B, in addition a pressure relief valve 11 is illustrated, which valve is situated between fluidic inflow and outflow of the filter element and opens in the case of a critical maximum pressure in the filter element 13 in order to enable, furthermore, the withdrawal of (pressure-extracted) coffee via these fluid pipes. Furthermore, an electrical heating element 12 is illustrated in FIG. 2B, which heating element is connected to a voltage source 10 and can heat the filter element 13 to a desired temperature.

Figure 3:
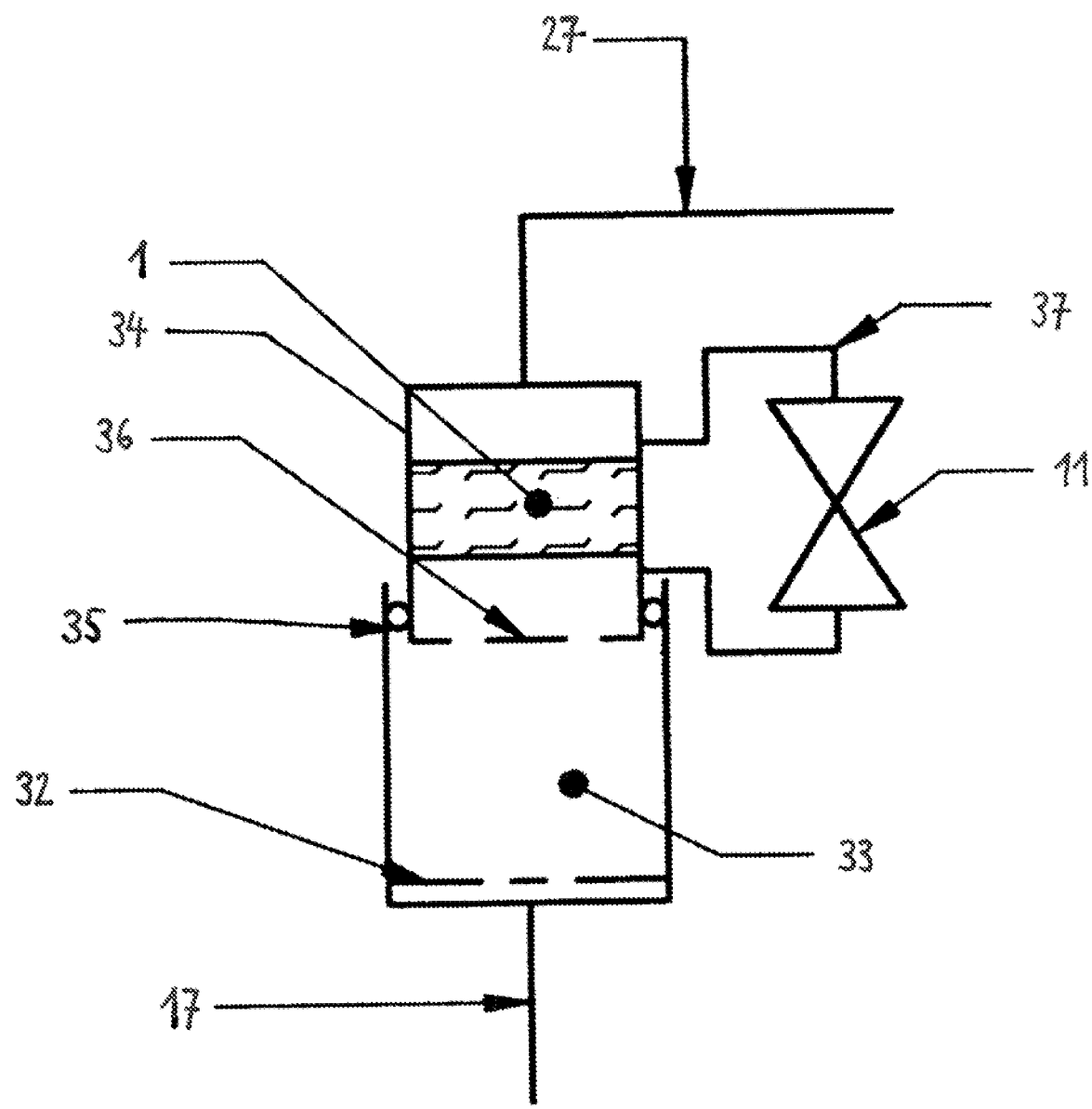
FIG. 3 is a schematic side view of an example arrangement of a filter element in a percolating unit.

FIG. 3 shows a schematic side view of a possible arrangement of a filter element 13 according to the invention in the percolating unit 34. Fluid (e.g. hot water) comes from the water inflow 17 and flows into the percolating unit 34. There, the hot water impinges firstly on a distribution sieve 32 and subsequently enters into the percolating chamber 33 which contains ground coffee (not shown). By applying pressure to the hot water (e.g. 4-16 bar), the hot water passes through the ground coffee which is pressed against the percolating sieve 36 and is retained there. Sealing elements 35 in the percolating unit 34 ensure that no water with applied pressure leaves the percolating unit 34 past the percolating sieve 36. The hot water dissolves and disperses substances from the ground coffee, the maximum size of the materials dispersed in the water depending upon the maximum pore size of the percolating sieve 36. As standard, the maximum pore size of the percolating sieve 36 is approx. 100 μm. The coffee extracted on the percolating sieve with a high particle content now impinges on the filter element 1 which has a maximum pore size which is smaller than the maximum pore size of the percolating sieve 35. After passing through the filter element 1, the coffee consequently has a lower particle content, the maximum particle size of the contained particles being determined by the maximum pore size of the filter element 1. Via the fluid pipe 27, the lower-particle coffee finally is transported to the outflow and, from there, can be dispensed into a cup or into a storage container. A pressure relief valve 11 can be situated connected fluidically in parallel to the filter element 1. The pressure relief valve 11 opens in the case of a critical high pressure in front of the filter element 1 and allows a bypass for the coffee extracted at the percolating sieve 35. In other words, in the case of a blockage of the filter element 1, the coffee extracted on the percolating sieve 35 (standard pressure-extracted coffee) can flow past the filter element 1 via the fluid pipe 27 in the outflow direction. This ensures that, even in the case of a blockage of the filter element 1, also withdrawal of (standard pressure-extracted) coffee is possible.

Figure 4:
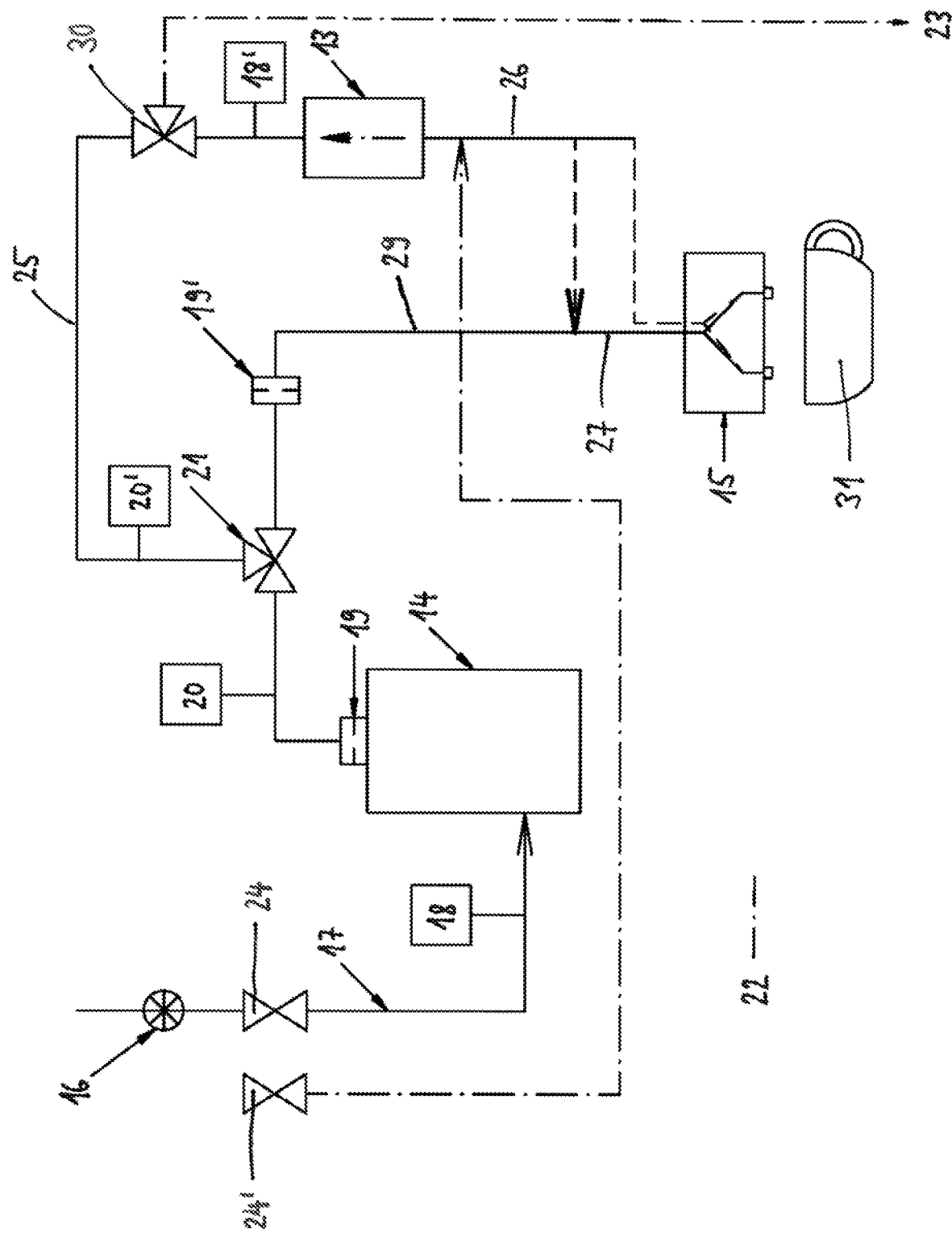
FIG. 4 shows schematically a circuit diagram of a coffee machine.

FIG. 4 shows schematically a circuit diagram of a coffee machine according to the invention. The throughflow meter 16 ensures that only a specific, prescribed quantity of fluid (e.g. water) passes into the water inflow 17 of the device. Upstream of the percolating unit 14 for extraction of coffee, a pressure sensor 18 (or pressure switch) for measuring the percolating pressure is situated. In this embodiment, a diaphragm 19 is disposed downstream of the percolating unit, through which diaphragm the extracted coffee flows. Furthermore, the coffee machine can have a control unit which can be operated by a user of the coffee machine. The control unit can actuate a bypass valve 21 in order to influence the flow direction of the extracted coffee (e.g. along different fluid pipes of the coffee machine). The bypass valve 21 can of course also be actuated manually. If only a standard pressure-extracted coffee (such as e.g. espresso) is desired, then the bypass valve 21 is switched here so that the extracted coffee flows via the diaphragm 19' and the fluid pipes 29, 27 to the outflow 15 where the standard, pressure-extracted (particle-rich) coffee is finally dispensed (here into the cup 31). If however a pressure-extracted coffee with a low particle content, i.e. a coffee similar to the standard filter coffee, is desired, then the bypass valve is switched such that the extracted coffee flows via the fluid pipe 25 and through the flush valve 30 to the filter element 13 and finally via the fluid pipe 26 to the outflow 15 where the low-particle coffee is finally dispensed (here into the cup 31). Suspended particles and emulsified particles (e.g. coffee oil droplets) are hereby withdrawn from the coffee extracted in the percolating unit 14 by the filter element 13. Upstream of the filter element 13, a pressure sensor 18' (or pressure switch) is disposed, which monitors the pressure in front of the filter element 13 and possibly opens a pressure relief valve on the filter element 13 in order to convey coffee past the filter element 13 via fluid pipe 26 in the outflow direction 15. Along the transport path of the extracted coffee, compressed air supply lines 20, 20' (via air pump) are disposed in order to convey residual coffee situated in the fluid pipes 25, 26, 27, 29, in particular before a further withdrawal of coffee, out of the fluid lines into the collection shell of the coffee machine. Should the filter element 13 be blocked during operation of the coffee machine, then the possibility exists of allowing fluid (e.g. water) to flow from a fluid source via opening of a valve 24' in the opposite direction 22 (upstream) through the element 13 in the direction 23 of the collection shell of the coffee machine and hence to effect backflushing and cleaning of the filter element 13.

Figure 5:
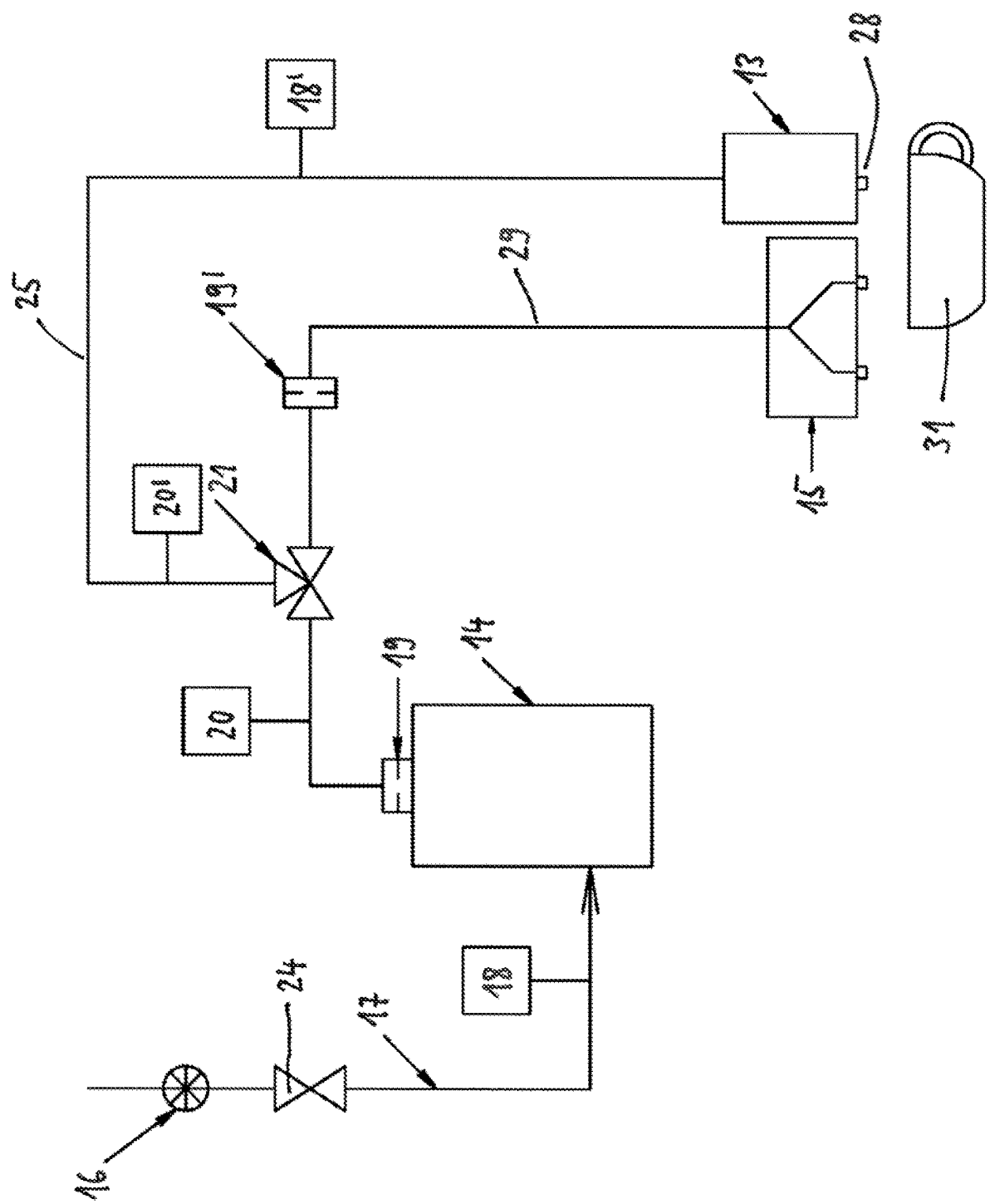
FIG. 5 shows schematically a circuit diagram of a variant of a coffee machine.

FIG. 5 shows schematically a circuit diagram of a variant of a coffee machine according to the invention. The construction of this coffee machine essentially corresponds to the construction illustrated in FIG. 4. The reference numbers of FIG. 4 apply for FIG. 5 correspondingly. One difference of the device illustrated here relative to the device of FIG. 4 is that the filter element 13 is disposed in the region of the outflow 15 for dispensing coffee or is connected reversibly to the latter. In this respect, the filter element 13 also requires no fluid pipe towards the outflow 15 but rather can itself have an outflow 28 for dispensing coffee. Since the outflow 15 is situated in the outer region of the coffee machine, also the filter element 13 is in this case disposed in the outer region of the coffee machine. This arrangement has hence the advantage that simple and rapid exchangeability of the filter element 13 is ensured.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A coffee machine for preparation of pressure-extracted coffee with a low particle content, the coffee machine comprising:
   a percolating unit for extraction of coffee with a liquid under pressure, the percolating unit comprising a percolating sieve;
   an outflow for dispensing coffee, the outflow disposed downstream of the percolating unit; and
   a filter element for reducing particle content of coffee, the filter element disposed downstream of the percolating sieve and connected fluidically to the percolating sieve and to the outflow,
   wherein the filter element comprises at least one filter which has a maximum pore size of 80 μm and further comprises at least one fine filter which has a maximum pore size of 25 μm.

2. The coffee machine of claim 1, wherein the filter element is disposed
   in the percolating unit,
   between the percolating unit and the outflow,
   at the outflow, or
   in the outflow.

3. The coffee machine of claim 2, wherein the filter element is disposed within a housing of the coffee machine or behind an operating diaphragm, to be opened, of the coffee machine.

4. The coffee machine of claim 2, wherein the filter element is disposed in the percolating unit near the percolating sieve in the percolating unit or in contact with the percolating sieve.

5. The coffee machine of claim 1, wherein the filter element comprises:
   a fluid pipe which is connected upstream to the percolating unit;
   a fluid pipe which is connected downstream to the outflow; or
   the outflow or at least one further outflow.

6. The coffee machine of claim 1, wherein the filter element comprises:
   at least one ultrafine filter which has a maximum pore size of 10 μm.

7. The coffee machine of claim 6, wherein the filter element comprises paper, plastic material, or metal.

8. The coffee machine of claim 6, wherein the filter element, the at least one filter, the at least one fine filter, or the at least one ultrafine filter is essentially configured in a form of a linear or a diagonal cylinder.

9. The coffee machine of claim 8, wherein the filter element or a component thereof is subjected, with fluid,
   to a flow radially in a direction towards, or away from, an axis of the cylinder, or
   to a flow axially in a direction along an axis of the cylinder.

10. The coffee machine of claim 8, wherein the linear or the diagonal cylinder has a base which is selected from the group consisting of a circular base, a semi-circular base, a crescent-shaped base, an elliptical base and a base with at least two corners.

11. The coffee machine of claim 6, wherein the at least one fine filter is disposed downstream of the at least one filter, and the at least one ultrafine filter is disposed downstream of the fine filter.

12. The coffee machine of claim 6, wherein the filter element consists of the at least one filter, the at least one fine filter or the at least one ultrafine filter.

13. The coffee machine of claim 6, wherein the at least one filter, the at least one fine filter, or the at least one ultrafine filter has a thickness of a range of 0.1 mm to 10 mm.

14. The coffee machine of claim 1, wherein the percolating unit comprises a fluid pipe which is connected downstream to the outflow and represents a fluidic connection from the percolating unit to the outflow, circumventing the filter element.

15. The coffee machine of claim 1, wherein the coffee machine comprises a bypass valve upstream of the filter element, wherein the bypass valve is suitable for switching between a fluidic connection from the percolating unit via the filter element to the outflow, in a first position, and a fluidic connection from the percolating unit, circumventing the filter element, towards the outflow, in a second position, the bypass valve connected to a control unit configured to switch the bypass valve as a function of an input by a user of the coffee machine.

16. The coffee machine of claim 1,
wherein the coffee machine comprises at least one fluid pipe, which is connected to
the filter element,
a first fluid pipe disposed upstream of the filter element, or
a second fluid pipe disposed downstream of the filter element,
wherein the at least one fluid pipe comprises a valve or a flush valve, and wherein the at least one fluid pipe is connected to the outflow.

17. The coffee machine of claim 1, wherein the coffee machine comprises at least one mounting for the filter element, the at least one mounting configured to fix the filter element via a reversible connection to the coffee machine.

18. The coffee machine of claim 1, wherein the coffee machine comprises:
at least one sensor configured to detect a functional capacity of the filter element, or
a pressure relief valve configured to establish a fluidic connection from the percolating unit, circumventing the filter element, to the outflow at a pressure above a specific maximum pressure.

19. The coffee machine of claim 1, wherein the coffee machine comprises at least one unit for heating the filter element.

20. The coffee machine of claim 1, wherein the coffee machine comprises at least one fluid pipe between the filter element and the outflow, wherein the at least one fluid pipe is connectable or is connected to a hot water source or cold water source.

* * * * *